(12) United States Patent
Miremadi

(10) Patent No.: US 8,126,334 B2
(45) Date of Patent: Feb. 28, 2012

(54) METHOD FOR DETECTING A SIGNAL ON A PASSIVE OPTICAL NETWORK

(75) Inventor: Reza Miremadi, West Hills, CA (US)

(73) Assignee: Oplink Communications, Inc. a Delaware corporation, Fremont, CA (US)

( * ) Notice: Subject to any disclaimer, the term of this patent is extended or adjusted under 35 U.S.C. 154(b) by 666 days.

(21) Appl. No.: 12/254,217

(22) Filed: Oct. 20, 2008

(65) Prior Publication Data

US 2009/0142067 A1   Jun. 4, 2009

Related U.S. Application Data

(60) Provisional application No. 60/990,991, filed on Nov. 29, 2007.

(51) Int. Cl.
*H04B 10/12* (2006.01)

(52) U.S. Cl. ........... 398/141; 398/139; 398/28; 398/151

(58) Field of Classification Search ........... 398/141, 398/151, 153, 158, 202, 206, 208, 214, 159, 398/149, 139, 136, 134, 28, 33, 26, 20, 16, 398/13
See application file for complete search history.

(56) References Cited

U.S. PATENT DOCUMENTS

| | | |
|---|---|---|
| 5,504,608 A | 4/1996 | Neeves et al. |
| 5,553,081 A | 9/1996 | Downey et al. |
| 5,594,578 A | 1/1997 | Ainslie et al. |
| 5,699,386 A | 12/1997 | Measor et al. |
| 5,828,476 A | 10/1998 | Bonebright et al. |
| 5,838,731 A | 11/1998 | Nagahori |
| 5,937,330 A | 8/1999 | Vince et al. |
| 6,072,366 A | 6/2000 | Maeda et al. |
| 6,307,659 B1 | 10/2001 | Gilliland et al. |
| 6,377,392 B1 | 4/2002 | Mizrahi |
| 6,516,106 B2 | 2/2003 | Johnson et al. |
| 6,961,423 B2 | 11/2005 | Pessoa et al. |
| 6,963,696 B1 | 11/2005 | Bowler et al. |
| 7,003,265 B2 | 2/2006 | Jeon et al. |
| 7,178,992 B2 | 2/2007 | Vafiades et al. |
| 7,206,521 B2 | 4/2007 | Doh et al. |
| 7,224,516 B2 | 5/2007 | Fisher |
| 7,254,116 B2 | 8/2007 | Robinson et al. |
| 7,274,920 B2 | 9/2007 | Jin |
| 2002/0089737 A1* | 7/2002 | Sugata et al. ........... 359/326 |

* cited by examiner

*Primary Examiner* — M. R. Sedighian
(74) *Attorney, Agent, or Firm* — Barlow, Josephs & Holmes, Ltd.

(57) ABSTRACT

A transceiver assembly is provided for use in an optical telecommunications network. The circuitry arrangement in the transceiver of the present invention generates a ranging signal that is transmitted along the fibers attached thereto and then filters the return signal in a manner that eliminates virtually all of the noise effects found on the fiber to provide a highly reliable timing signal for an accurate delay calculation. A band pass filter is supplied in line before the input signal is allowed to pass to the ranging signal detector and comparator thereby allowing only a signal at the fundamental frequency of the input signal to pass, thereby eliminating false signal detect triggers.

13 Claims, 3 Drawing Sheets

US 8,126,334 B2

METHOD FOR DETECTING A SIGNAL ON A PASSIVE OPTICAL NETWORK

CROSS-REFERENCE TO RELATED APPLICATIONS

This application is related to and claims priority from earlier filed U.S. Provisional Patent Application No. 60/990,991, filed Nov. 29, 2007.

BACKGROUND OF THE INVENTION

The present invention relates generally to fiber optic telecommunication systems. More specifically, the present invention relates to a fiber optic receiver assembly for use in a passive optical network that must receive, convert and sequence burst mode optical signals from a plurality of sources, wherein each signal being received has a different amplitude (power level) and relative timing as compared to adjacent bursts.

In an effort to increase the available bandwidth for the delivery of services such as streaming media and the like, telecommunication companies are slowly starting to convert their carrier networks from traditional copper wiring to passive optical network systems as part of Fiber To The Premise (FTTP) and Fiber To The Home (FTTH) communication and content delivery services. For example, a number of telecommunications service providers are now offering fiber optic Internet services and fiber optic television services. These passive optical networks are structured in a manner that is generally similar to the older copper wire networks. As can be seen in FIG. 1, a representative passive optical network can be seen to a plurality of communications lines 2 that extend outwardly to each of the individual service locations 4 (homes or businesses) from a central office 6 (CO) location. The CO 6 in turn serves to control, direct and monitor the transmission and receipt of the signals 8, 10, 12 traveling to and from each of the connected individual service locations 4.

In operation, the various signals from the individual service locations are connected to a single transmission fiber using a passive optical splitter. To allow the sharing of the fiber bandwidth in this manner each service location transfers a packet of data using a predetermined time slot. This type of data is typically called burst mode data. In other words, a plurality of subscribers utilizes one optical line in a time division multiplex manner, but a receiver on the line recognizes that each subscriber sends data in bursts at random times. The difficulty with this arrangement in a passive optical network is that received data or packets are different in both amplitude and phase from one another due to the differences in optical losses occurring on different transfer paths.

In this regard, one of the current technical issues being addressed in the implementation of the passive optical networking environment is the fact that there is a large variation in both the amplitude and the timing of the incoming signals 8, 10, 12 being received at the CO 6 from each of the individual service locations 4. For example, in a FTTH system, one service location 4 may be located 0.5 miles from the central office 6, while another service location 4 may be located 5.0 miles from the central office 6. In each of these service locations 4, the transmitters are essentially the same and therefore transmit their respective data signals 8, 10, 12 to the CO 6 using the same output power level. The difficulty arises as a result of the fact that, since optical signals degrade within a fiber optic cable over distance and pick up slight timing delays due to the distance traversed, the signal received 12 at the CO 6 from the closer service location has a timing delay and an amplitude that is larger than the amplitude of the signal received 10 at the CO 6 from the more distant location. These differences in amplitude and timing become a problem because the passive optical network systems are time division multiuplexed (TDM) systems, where the CO 6 receiver is constantly receiving timed bursts 8, 10, 12 in a random pattern from each of the different locations, one after another, with a signal spacing of tens of nanoseconds. As a result, the receivers must be able to quickly and accurately detect and convert all of the incoming signal bursts from the different locations, each having varying amplitudes and time delays, into valid data. Further, in order to correctly process each of the bursts, the CO receiver needs to predict the time delay associated with transmission traveling along each of these different fiber transmission paths.

In order to account for this variable delay, another important aspect to the operation of the passive optical network system is the "ranging" mode. In this mode, the CO box, which has a multitude of fiber optic transceivers within it that are each attached to the various transmission fibers, sends out a one/zero pattern continuously until it receives a signal-detect signal. Based on the receipt of a signal detect the box knows the fiber delay associated with the transceiver module on any given fiber and prepares the timing signal accordingly to interact with it. In the prior art arrangement as depicted at FIGS. 2 and 3, the system employs a detector 14 and a low pass filter 16 is used to determine the level of the input signal. This level is compared to a reference level 18, by comparator 20 and if the signal exceeds the reference level the signal detect is asserted. The input to this detector 20 can come from the output of the transimpedance amplifier 22 as shown in FIG. 2 or the output of the post amplifier 23 as shown in FIG. 3. Generally however the problem that is encountered in this mode is that the signal detect is often triggered prematurely by noise that is present in the system. When noise is encountered during the time that the transceiver is waiting for the return signal, the transimpedance amplifier and or the post amplifier may treat noise detected in the system as a valid data signal thereby creating an incorrect delay factor.

In view of the foregoing there is therefore a need for a transceiver that can be used in a passive optical networking environment that reduces the signal noise that is passed along to the signal detect monitor in order to reduce the number of false signal detect triggers. Further, there is a need for a transceiver that filters the ranging signal in a manner that only allows the returning ranging signal to reach the detector to generate a signal detect signal thereby eliminating false triggers and insuring correct delay factor calculation.

BRIEF SUMMARY OF THE INVENTION

In this regard, the present invention provides for an improved transceiver assembly for use in an optical telecommunications network. The circuitry arrangement in the transceiver of the present invention generates a ranging signal that is transmitted along the fibers attached thereto and then filters the return signal in an manner that eliminates virtually all of the noise effects found on the fiber to provide a highly reliable timing signal for an accurate delay calculation. Further, the particular arrangement of the transceiver assembly of the present invention allows only a ranging signal that returns at the fundamental frequency to pass through the signal detect circuitry thereby insuring an accurate signal detect is being passed along for use in processing the delay signal for signal bursts transmitted along that fiber.

It is commonly known in the art, that in order to facilitate balancing of the plurality of signal bursts from a plurality of different remotely located signal transmitters in a passive optical network, each signal path is tested using a ranging signal and that noise along the fiber can interfere with the ranging signal providing a false signal trigger. In accordance with the present invention a band pass filter is supplied in line before the input signal is allowed to pass to the ranging signal detector and comparator thereby allowing only a signal at the fundamental frequency of the input signal to pass thereby eliminating false signal detect triggers. In reviewing the prior art depicted in FIGS. 2 and 3, the prior art has a detector 14 and a low pass filter 16 to determine the level of the input signal. This level is compared to a reference level 18, by comparator 20 and if the signal exceeds the reference level the signal detect is asserted. The input to this detector can come from the output of the transimpedance amplifier (FIG. 2) or the output of the post amplifier (FIG. 3). In contrast, the present invention provides for the placement of a band pass filter at the beginning of the block and ahead of the detector as depicted in FIGS. 4 and 5.

Since the ranging signal is composed of a continuous one and zero pattern. This creates a square wave pattern at half the bit rate. A square wave is composed of odd harmonics of the fundamental frequency. The implementation of the band pass filter in turn only allows signal at the fundamental frequency to pass, while rejecting all other frequencies. In effect only the ranging signal is allowed to pass through to the detector while any noise on the fiber optic is filtered out.

It is therefore an object of the present invention to provide a transceiver assembly that can be used in a passive optical networking environment that reduces the signal noise that is passed along to the signal detect monitor in order to reduce the number of false signal detect triggers. Further, it is an object of the present invention to provide a transceiver that filters the ranging signal in a manner that only allows the returning ranging signal to reach the detector to generate a signal detect signal thereby eliminating false triggers and insuring correct delay factor calculation.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
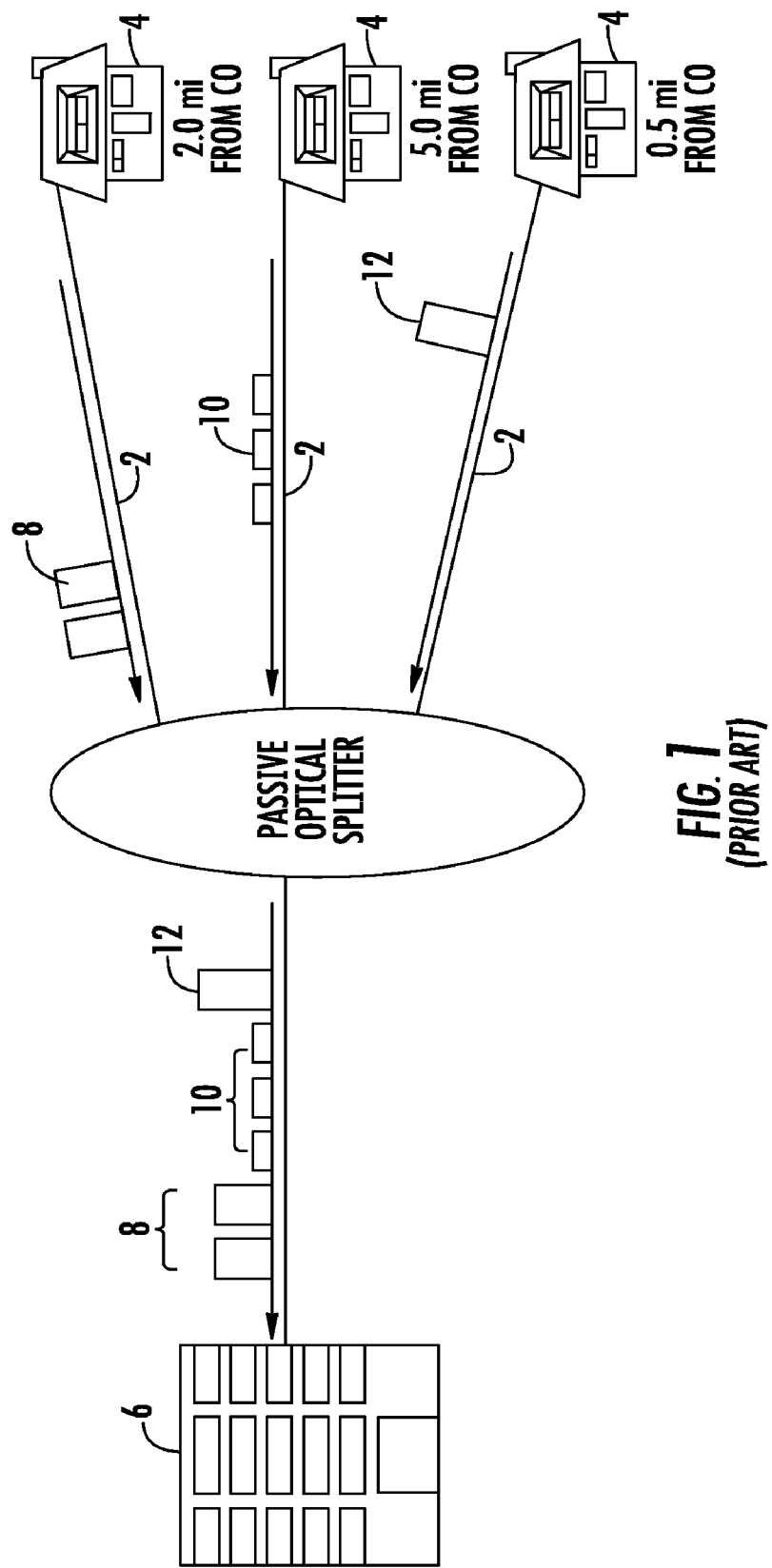
FIG. 1 is a graphical illustration of a prior art passive optical network transmitting burst mode signals having varying amplitude.
Figure 2:
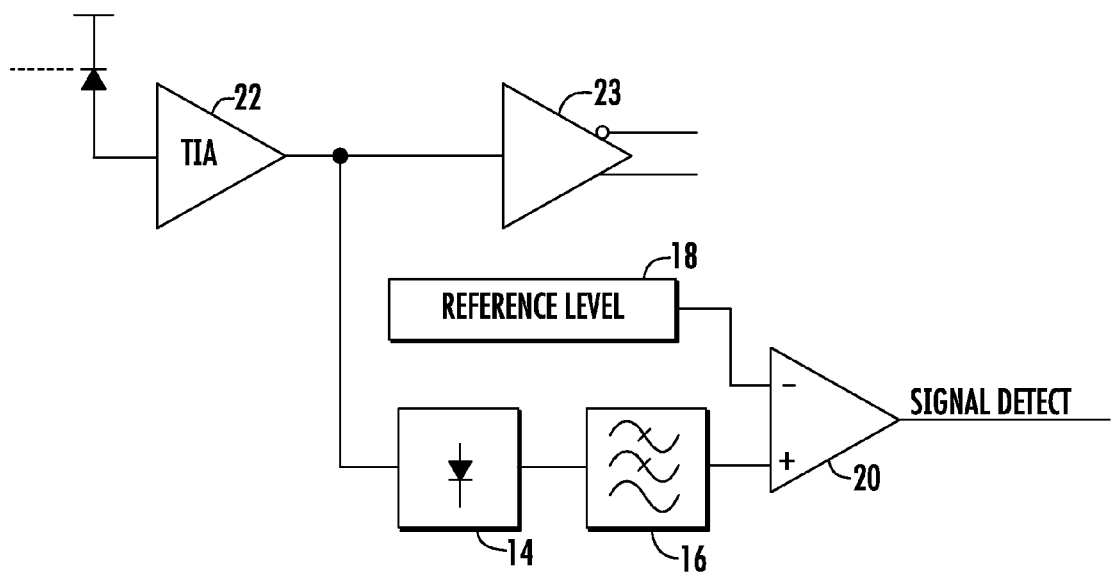
FIG. 2 is a schematic illustration of a prior art burst mode transceiver configuration.
Figure 3:
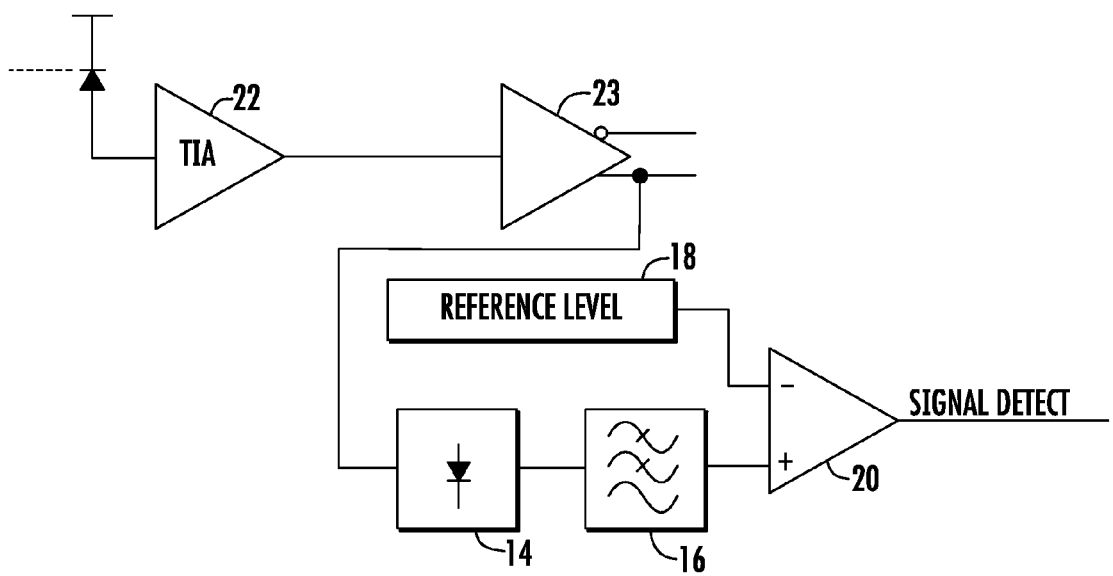
FIG. 3 is a schematic illustration of an alternate prior art burst mode transceiver configuration.
Figure 4:
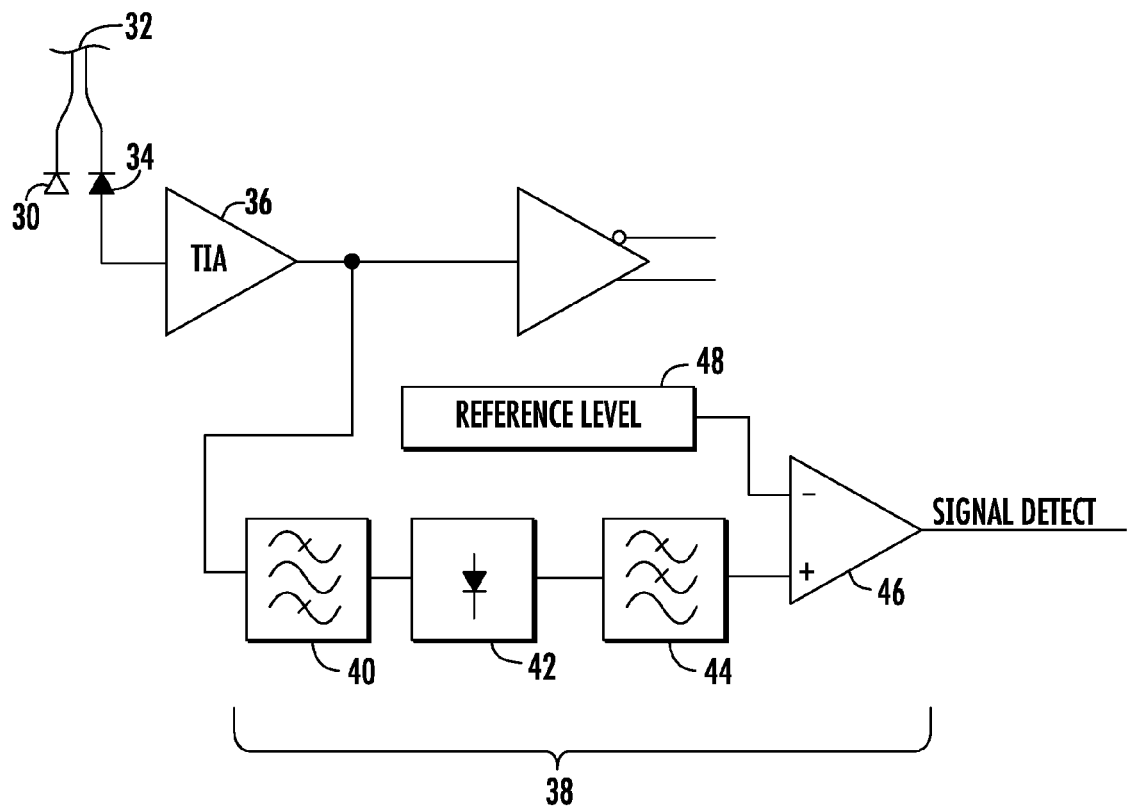
FIG. 4 is a schematic illustration of a preferred embodiment of the burst mode transceiver configuration of the present invention.
Figure 5:
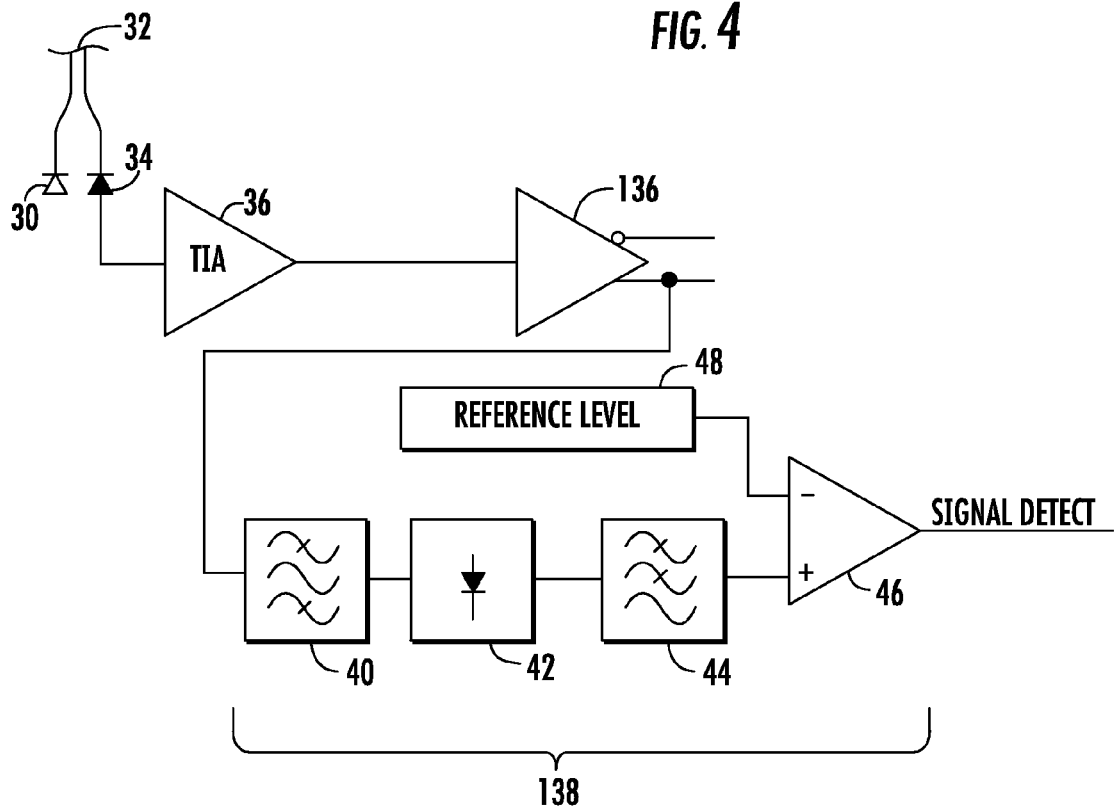
FIG. 5 is a schematic illustration of a second preferred embodiment of the burst mode transceiver configuration of the present invention.

Now referring to the drawings, the arrangement for the transceiver assembly of the present invention is shown and generally illustrated in FIGS. 4 and 5. As was stated above the circuitry arrangement in the transceiver of the present invention generates a ranging signal that is transmitted along the fibers attached thereto and then filters the return signal in an manner that eliminates virtually all of the noise effects found on the fiber to provide a highly reliable timing signal for an accurate delay calculation. Further, the particular arrangement of the transceiver assembly of the present invention allows only a ranging signal that returns at the fundamental frequency to pass through the signal detect circuitry thereby insuring an accurate signal detect is being passed along for use in processing the delay signal for signal bursts transmitted along that fiber.

In the most general terms, the present invention as depicted in FIG. 4 is directed to a burst mode transceiver assembly that includes a transmitter 30 for generating and transmitting a ranging signal along a fiber strand 32, a receiver 34 coupled to the fiber strand 32 for detecting a return ranging signal along the fiber strand 32, an amplifier 36 such as a transimpedance amplifier coupled to an output of the receiver diode 34 for receiving incoming signals including the return ranging signal and a signal detect circuit 38 coupled to an output of the transimpedance amplifier 36. In the context of the present invention, the signal detect circuit 38 preferably includes a band pass filter 40 that allows only return ranging signals having a fundamental frequency matching a fundamental frequency of the ranging signal to pass therethrough to a signal detector 42 coupled to an output of the band pass filter 40, a low pass filter 44 coupled to an output of the signal detector 42 and a comparator 46 coupled to an output of the low pass filter 44. In operation the signal detect circuit 38 first filters the frequency of the incoming signals such that the band pass filter 40 only allows passage of signals at the fundamental frequency of the signal detect signal and the low pass filter 44 only allows the low or zero value of that signal to then pass to the comparator 46. As a result, the comparator 46 compares the output from the low pass filter 44 to a threshold value 48 and asserts a signal detect signal if the output of the low pass filter 44 is greater than said threshold value 48. This signal detect is then employed to calculate a time required for the transmitted signal to traverse the fiber strand 32 in order to determine a delay factor for that fiber strand 32. In this regard, a controller is provided for calculating the delay factor for signals along the fiber strand 32 based the time required between transmission of the ranging signal and assertion of the signal detect.

In operation of the signal detect circuit 38 the output of the band pass filter 40 is passed through the detector 42 and low pass filter 44 to the comparator 46. It should be noted that the energy of the signal that we are interested in is focused at half the bit rate and its odd harmonics. In contrast, the energy in the noise is spread out over a large frequency band form and is at very low frequencies relative to the bit rate. As a result, the detector 42 and comparator 46 have no problem distinguishing between the two and providing for a reliable signal-detect. Accordingly, when the energy at the detector 42 exceeds the reference level 48 as determined by the comparator 46 the signal detect signal is asserted. In the preferred embodiment, the band pass filter 40 is a single section band-pass RLC with a Q of 3.7, however other variations are also possible.

Similarly, when balancing a plurality of signal bursts from a plurality of different remotely located signal transmitters in a passive optical network, each signal path is tested using a ranging signal that is transmitted along the fiber. In other-words, the TIA may be receiving a signal from a single fiber strand or from a plurality of signals from a plurality of fiber strands such that the controller determines a corresponding delay factor for adjusting the timing of signal bursts received along each of the fiber strands.

In essence, the ranging signal is composed of a continuously alternating one and zero pattern that creates a square wave pattern at half the bit rate. This ranging signal is sent out along the fiber carrier and the time required for the signal to return and trigger a signal detect is recorded in order to calculate a delay factor for that particular fiber carrier. As the ranging signal is transmitted, any noise contained on the fiber carrier can interfere with the returning ranging signal in that sufficient noise on the fiber can trigger a false signal detect before the return of the actual ranging signal. Principally, it is the use of the band pass filter 40 that is supplied in line before the input signal is allowed to pass to the ranging signal detector 42 and comparator 46 thereby allowing only a signal at the fundamental frequency of the input signal to pass thereby eliminating false signal detect triggers. Ultimately the band pass filter 40 and said low pass filter 44 cooperate to pass a signal that exhibits the low threshold of the return ranging signal at half the bit rate of the original ranging signal so that in effect only the ranging signal is allowed to pass through to the detector while any noise on the fiber optic is filtered out.

Turning to FIG. 5 an alternate embodiment arrangement is provided wherein a burst mode transceiver assembly includes a transmitter 30 for generating and transmitting a ranging signal along a fiber strand 32, a receiver 34 coupled to the fiber strand 32 for detecting a return ranging signal along the fiber strand 32, an amplifier such as a transimpedance amplifier 36 coupled to an output of the receiver diode 34 for receiving incoming signals including the return ranging signal, a post amplifier 136 for amplifying the received signal and a signal detect circuit 138 coupled to an output of the post amplifier 136. While in all other aspects this embodiment operates in the same manner as described above, this particular arrangement provides for the signal detect circuit 138 to operate on the amplified signal rather than the preamplified signal.

Finally, in terms of a method, the present invention provides a method of generating a signal detect signal in a transceiver for a burst mode communication system. In accordance with the method, a ranging signal is generated and transmitted along a fiber strand. A return ranging signal is then detected as it is sent back along the fiber strand. The returning signal is filtered using a band pass filter that allows only return ranging signals having a fundamental frequency matching a fundamental frequency of the ranging signal to pass to a detector that detects the output of the band pass filter. This detected output is then compared to a threshold value at a comparator that asserts a signal detect signal if the output is greater than the threshold value.

It can therefore be seen that the present invention provides a transceiver assembly that can be used in a passive optical networking environment that reduces the signal noise that is passed along to the signal detect monitor in order to reduce the number of false signal detect triggers. Further, the present invention provides a transceiver that filters the ranging signal in a manner that only allows the returning ranging signal to reach the detector to generate a signal detect signal thereby eliminating false triggers and insuring correct delay factor calculation. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A burst mode transceiver comprising:
   a transmitter for generating and transmitting a ranging signal including alternating 0 and 1 values at a fundamental frequency along a fiber strand;
   a receiver for detecting a return ranging signal along said fiber strand, said return ranging signal including alternating 0 and 1 values at a fundamental frequency, harmonic signals of said fundamental frequency and noise signals induced along said fiber strand;
   a transimpedance amplifier coupled to said receiver for receiving incoming signals including said return ranging signal; and
   a signal detect circuit coupled to an output of said transimpedance amplifier, including:
      a band pass filter, said band pass filter allowing only return ranging signals having 0 and 1 values at the fundamental frequency of the ranging frequency to pass;
      a signal detector coupled to an output of said band pass filter;
      a low pass filter coupled to an output of said signal detector; and
      a comparator coupled to an output of said low pass filter, said comparator comparing the output from said low pass filter to a threshold value, said comparator asserting a signal detect signal if said output is greater than said threshold value.

2. The burst mode transceiver of claim 1, further comprising:
   a controller, said controller calculating a delay factor for signals along said fiber strand based the time required between transmission of said ranging signal and assertion of said signal detect.

3. The burst mode transceiver of claim 2, said transimpedance amplifier receiving a plurality of signals from a plurality of fiber strands, said controller determining a corresponding delay factor for adjusting the timing of signal bursts received along each of said fiber strands.

4. The burst mode transceiver of claim 1, wherein said band pass filter and said low pass filter cooperate to pass a signal that exhibits the low threshold of the return ranging signal at half the bit rate of the original ranging signal.

5. A burst mode transceiver comprising:
   a transmitter for generating and transmitting a ranging signal including alternating 0 and 1 values at a fundamental frequency along a fiber strand;
   a receiver for detecting a return ranging signal along said fiber strand, said return ranging signal including alternating 0 and 1 values at a fundamental frequency, harmonic signals of said fundamental frequency and noise signals induced along said fiber strand;
   a transimpedance amplifier coupled to said receiver for receiving incoming signals including said return ranging signal;
   a post amplifier coupled to an output of said transimpedance amplifier and
   a signal detect circuit coupled to an output of said post amplifier, including:
      a band pass filter, said band pass filter allowing only return ranging signals having 0 and 1 values at the fundamental frequency of the ranging frequency to pass;

a signal detector coupled to an output of said band pass filter;

a low pass filter coupled to an output of said signal detector; and a comparator coupled to an output of said low pass filter, said comparator comparing the output from said low pass filter to a threshold value, said comparator asserting a signal detect signal if said output is greater than said threshold value.

6. The burst mode transceiver of claim 5, further comprising:

a controller, said controller calculating a delay factor for signals along said fiber strand based the time required between transmission of said ranging signal and assertion of said signal detect.

7. The burst mode transceiver of claim 6, said transimpedance amplifier receiving a plurality of signals from a plurality of fiber strands, said controller determining a corresponding delay factor for adjusting the timing of signal bursts received along each of said fiber strands.

8. The burst mode transceiver of claim 5, wherein said band pass filter and said low pass filter cooperate to pass a signal that exhibits the low threshold of the return ranging signal at half the bit rate of the original ranging signal.

9. A signal detect circuit for a burst mode transceiver including a transmitter for generating and transmitting a ranging signal including alternating 0 and 1 values at a fundamental frequency along a fiber strand, a receiver for detecting a return ranging signal along said fiber strand said return ranging signal including alternating 0 and 1 values at a fundamental frequency, harmonic signals of said fundamental frequency and noise signals induced along said fiber strand, and a transimpedance amplifier coupled to said receiver for receiving incoming signals including said return ranging signal, said signal detect circuit coupled to an output of said transimpedance amplifier comprising:

a band pass filter, said band pass filter allowing only return ranging signals having 0 and 1 values at the fundamental frequency of the ranging frequency to pass;

a signal detector coupled to an output of said band pass filter;

a low pass filter coupled to an output of said signal detector; and a comparator coupled to an output of said low pass filter, said comparator comparing the output from said low pass filter to a threshold value, said comparator asserting a signal detect signal if said output is greater than said threshold value.

10. The signal detect circuit of claim 9, further comprising:

a controller, said controller calculating a delay factor for signals along said fiber strand based the time required between transmission of said ranging signal and assertion of said signal detect.

11. The signal detect circuit of claim 10, said transimpedance amplifier receiving a plurality of signals from a plurality of fiber strands, said controller determining a corresponding delay factor for adjusting the timing of signal bursts received along each of said fiber strands.

12. The signal detect circuit of claim 9, wherein said band pass filter and said low pass filter cooperate to pass a signal that exhibits the low threshold of the return ranging signal at half the bit rate of the original ranging signal.

13. A method of generating a signal detect signal in a transceiver for a burst mode communication system, said method comprising:

generating and transmitting a ranging signal including alternating 0 and 1 values at a fundamental frequency along a fiber strand;

detecting a return ranging signal along said fiber strand, said return ranging signal including alternating 0 and 1 values at a fundamental frequency, harmonic signals of said fundamental frequency and noise signals induced along said fiber strand;

filtering said return ranging signal using a band pass filter, said band pass filter allowing only return ranging signals having 0 and 1 values at the fundamental frequency of the ranging frequency to pass;

detecting an output of said band pass filter at a signal detector; and comparing at a comparator the output from said signal detector to a threshold value, said comparator asserting a signal detect signal if said output is greater than said threshold value.

* * * * *